United States Patent
Klingenberg et al.

(10) Patent No.: US 10,268,401 B2
(45) Date of Patent: Apr. 23, 2019

(54) BACKUP CONSOLIDATION

(71) Applicant: International Business Machines Corporation, Armonk, NY (US)

(72) Inventors: Bernhard J. Klingenberg, Grover Beach, CA (US); Steven M. Reps, Sandy Hook, CT (US); Kurt A. Rybczyk, Waterbury, CT (US); Lisa A. Shepard, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 15/421,517

(22) Filed: Feb. 1, 2017

(65) Prior Publication Data

US 2018/0217767 A1    Aug. 2, 2018

(51) Int. Cl.
*G06F 12/00* (2006.01)
*G06F 3/06* (2006.01)

(52) U.S. Cl.
CPC .......... *G06F 3/0619* (2013.01); *G06F 3/0647* (2013.01); *G06F 3/0686* (2013.01)

(58) Field of Classification Search
None
See application file for complete search history.

(56) References Cited

U.S. PATENT DOCUMENTS

| | | | |
|---|---|---|---|
| 6,148,412 A | 11/2000 | Cannon et al. | |
| 6,304,880 B1 | 10/2001 | Kishi | |
| 8,458,422 B1* | 6/2013 | Holdman | G06F 3/0605 |
| | | | 711/162 |
| 8,769,049 B2 | 7/2014 | Murphy et al. | |
| 9,069,799 B2 | 6/2015 | Vijayan | |
| 2015/0095294 A1* | 4/2015 | Tsuda | G06F 17/30135 |
| | | | 707/693 |

OTHER PUBLICATIONS

Kruse, "The Repack Challenge," Journal of Physics: Conference Series, vol. 513, No. 4, IOP Publishing, 2014, 6 pages.

* cited by examiner

*Primary Examiner* — Baboucarr Faal
(74) *Attorney, Agent, or Firm* — Yee & Associates, P.C.; Maeve Carpenter

(57) ABSTRACT

A method, computer system and computer program product for managing tapes storing a backup for a node. The method identifies the node for which a current set of tapes is present. The method determines whether the current set of tapes exceeds a threshold for undesired fragmentation for the node and moves data in the current set of tapes to a new set of tapes when a physical tape count exceeds the threshold for undesired fragmentation, wherein the data is more contiguous in the new set of tapes than the current set of tapes.

20 Claims, 3 Drawing Sheets

BACKUP CONSOLIDATION

BACKGROUND

1. Field

The disclosure relates generally to an improved computer system, and more specifically, to a method and apparatus of managing tapes storing backups for nodes.

2. Description of the Related Art

Magnetic tape is often used as a backup medium for data. This type of tape is typically located in cartridges that are in a tape storage system. The tape storage system may also be referred to as a tape library, a tape silo, or a tape jukebox. Within a tape storage system, storage structures are present that contain one or more tape drives, as well as slots that hold tape cartridges. These tape cartridges may be loaded into the tape drives to be written or read. Tape cartridges with magnetic tape are also referred to as tapes.

Tape storage systems may store immense amounts of data. For example, a tape storage system may store, for example, from about 20 terabytes up to about two exabytes of data. This type of capacity is typically a multiple of thousands of times more than is provided by a hard disk drive, and much more storage than what is available in network attached storage systems. Tape storage systems provide a cost effective solution for backing up large amounts of data. The tape storage systems also may provide systematic access to very large quantities of data.

A trade-off for the larger capacity of the tape drive system is slower access time. Slower access time occurs, for example, through the mechanical manipulation of tapes. Additionally, data is stored linearly on the tapes. As result, increased access time occurs when moving a tape to the right position to read the data. Accessing the data in a tape storage system may take several seconds to several minutes.

SUMMARY

An embodiment of the present invention provides for a method, computer system and computer program product for managing tapes storing a backup for a node. The method comprises identifying, by a computer system, the node for which a current set of tapes is present. The method determines whether a physical tape count for the current set of tapes exceeds a threshold for undesired fragmentation for the node. The method moves the data in the current set of tapes to a new set of tapes when the physical tape count exceeds the threshold for undesired fragmentation, wherein the data is more contiguous in the new set of tapes than the current set of tapes. The computer system comprises a processor unit and a tape manager. The tape manager runs on the processor unit and identifies a node for which a current set of tapes are present. The tape manager determines whether a physical tape count for the current set of tapes exceeds a threshold for undesired fragmentation for the node and moves the data in the current set of tapes to a new set of tapes when the physical tape count exceeds the threshold for undesired fragmentation, wherein the data is more contiguous in the new set of tapes than the current set of tapes. The computer program product provides a computer-readable storage media, a first program code, a second program code, and a third program code, all running on the computer-readable storage medium. The first program code identifies a node for which a current set of tapes are present. The second program code determines whether the physical tape count for the current set of tapes exceeds a threshold for undesired fragmentation for the node. The third program code moves the data from the current set of tapes to a new set of tapes when the physical tape count exceeds a threshold for undesired fragmentation, wherein the data is more contiguous in the new set of tapes than the current set of tapes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments however, as well as the preferred mode of use, further objectives and features thereof, will be best understood by reference to the following detailed description of an illustrative embodiment of the present disclosure when read in conjunction with the accompanying drawings, wherein;

DETAILED DESCRIPTION

Figure 1:
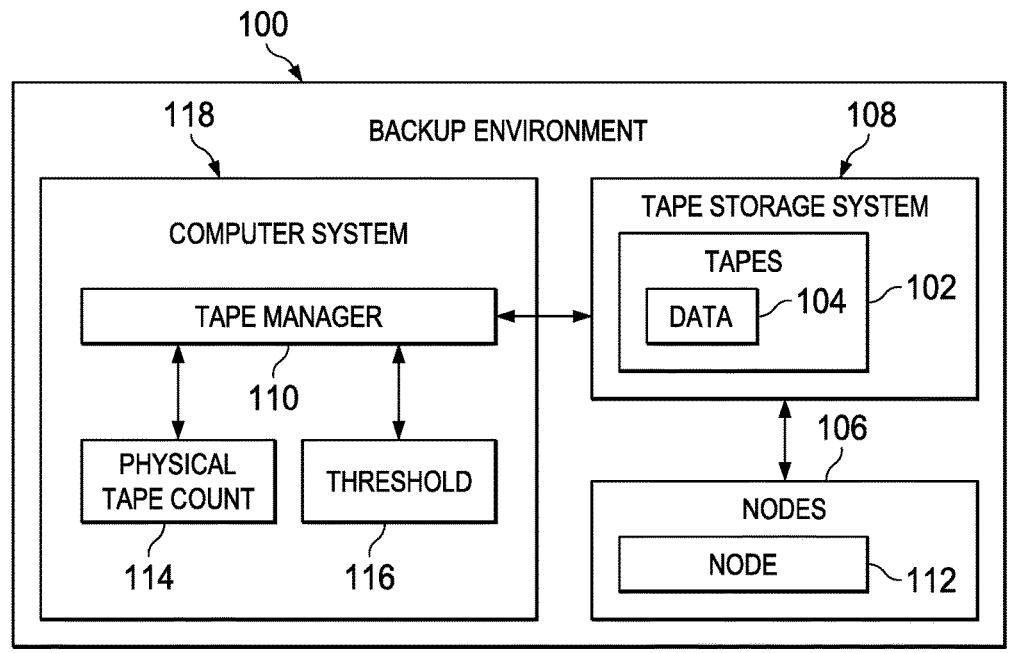
FIG. 1 is an illustration of a backup environment in accordance with an illustrative embodiment.

The present invention may be a system, a method, and/or a computer program product. The computer program product may include a computer-readable storage medium or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider. In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take account one or more different considerations. For example, the illustrative embodiments recognize and take account that tape fragmentation may reduce the speed at which data may be accessed. Tape fragmentation occurs when data is distributed among more than one tape. For example, with incremental backups, an initial backup is made and additional incremental backups occur to store new data that is added. These different incremental backups are often located on different tapes.

The illustrative embodiments recognize and take account that tape fragmentation may be a roadblock to meeting timely recovery time objective (RTO) standards that may be present for a backup and recovery service. The recovery time objective (RTO) standards may be set forth in a contractual obligation, such as a service-level agreement (SLA) or through other documents or sources.

The illustrative embodiments recognize and take account that one solution to counteract tape fragmentation from incremental backups involves performing full backups on a periodic basis. In this manner, a one-step method is performed to make the data more contiguous. The illustrative embodiments recognize and take account, however, that scheduling full backups may be problematic when incremental backups are also being performed. Daily and periodic full backup schedules may conflict with each other. In addition, the full backups are costly and time-consuming. Also, full backups may be detrimental to the preservation of version-based retention ruleset parameters.

The illustrative embodiments recognize and take account that as the data is distributed among more and more tapes, the time needed to restore or otherwise access data increases. The time needed to access data includes picking from a tape slot, mounting the tape on a tape drive, and spooling the tape to the portion containing the data, rewinding the tape, removing the tape from the tape drive, and replacing the tape drive in a slot. This process is repeated for each tape on which data is present. Thus, the illustrative embodiments recognize and take account as the number of tapes increase, the amount of time for these different steps are multiplied, increasing the time needed to access the data.

With reference now to the figures and, in particular, with reference to FIG. 1, an illustration of a backup environment is depicted in accordance with an illustrative embodiment. In this illustrative example, backup environment 100 is an example of an environment in which an illustrative embodiment may be implemented to manage tapes 102 storing data 104 for nodes 106.

In the illustrative example, a node in nodes 106 is a computer system. The computer system is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

In this illustrative example, tapes 102 may be located in tape storage system 108. Tape storage system 108 may be located in a single geographic location or may be distributed across different geographic locations, depending on the implementation. Tape storage system 108 includes one or more tape drives for reading tapes 102 and one or more structures for holding tapes 102.

In this illustrative example, tape manager 110 is configured to manage tapes 102 for storing a backup for node 112 in nodes 106. In this illustrative example, node 112 may be selected from the group comprising a physical node or a virtual node. More specifically, node 112 may be a physical data processing system or a virtual data processing system for which a backup of data on the node may be made.

As depicted, tape manager 110 identifies node 112 for which a current set of tapes 102 is present. Node 112 is a data processing system. Node 112 may be, for example, selected from one a computer client, a server, a workstation, a laptop computer, a desktop computer, a set-top box, or some other type of data processing system that requires backup.

The current set of tapes 102 is for a portion of the node. This portion may be, for example, a drive, a directory, active data, inactive data, all data, a server, a virtual computer, or some other portion of node 112. A portion of node 112 may be all of node 112, depending on the particular implementation.

Tape manager 110 determines whether physical tape count 114 for the current set of tapes 102 exceeds threshold 116 for undesired fragmentation for node 112. In this illustrative example, threshold 116 is set on a per node basis. In other words, each node in nodes 106 may have a different value for threshold 116. The values may be set using a number of different factors including at least one of a recovery objective, a service-level agreement, a role of the node, a type of restore, or some other suitable type of parameter.

Tape manager 110 moves data 104 in the current set of tapes 102 to a new set of tapes 102 when physical tape count 114 exceeds threshold 116 for undesired fragmentation.

Threshold 116 is a number of tapes, in this example, and may be implemented in a number of different ways. In one example, the total summation of data belonging to node 112 is calculated at 100 Gigabytes within a tape storage system comprised of a set of tapes, each of which can typically hold one Terabyte. When the number of tapes which are being used to maintain the 100 Gigabytes exceeds a preset threshold of twenty, the defragmentation process in tape manager 110 will activate and will move all data belonging to node 112 from the twenty tapes to one tape. As a result, the data is more contiguous. Data 104 for node 112 is a more contiguous new set of tapes 102 than in the current set of tapes 102.

As used in this illustrative example, a "set of" used with reference to items means one or more items. For example, a set of tapes 102 is one or more of tapes 102.

Tape manager 110 may be implemented in software, hardware, firmware, or a combination thereof. When software is used, the operations performed by tape manager 110 may be implemented in program code configured to run on hardware, such as a processor unit. When firmware is used, the operations performed by tape manager 110 may be implemented in program code and data, and stored in persistent memory to run on a processor unit. When hardware is employed, the hardware may include circuits that operate to perform the operations in tape manager 110.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semi conductors.

In this illustrative example, tape manager 110 is located in computer system 118. Tape manager 110 may be located in one or more data processing systems in computer system 118 depending on the particular implementation.

In the illustrative example, one or more technical solutions are present that overcome a technical problem with increasing the speed at which data may be restored from tapes. As a result, one or more technical solutions may provide a technical effect of reducing fragmentation of data stored on tapes. The one or more technical solutions may be especially useful for backups that create a primary backup and then incremental backups for new data created after the primary backup. One or more of the technical solutions provide the ability to perform backup consolidation in a manner that reduces fragmentation of data backed up for a node or a group of nodes.

As a result, computer system 118 operates as a special purpose computer system in which tape manager 110 in computer system 118 enables reducing fragmentation of data 104 stored on tapes 102 for one or more of nodes 106. In particular, tape manager 110 transforms computer system 118 into a special purpose computer system as compared to currently available general computer systems that do not have tape manager 110.

The illustration of backup environment 100 in FIG. 1 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

Figure 2:
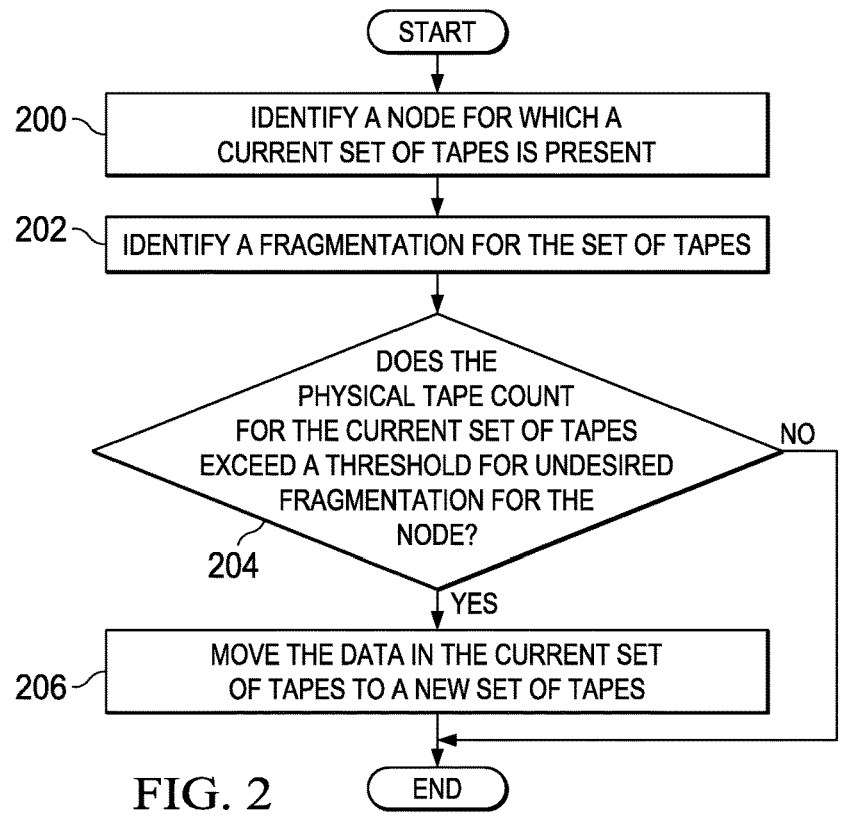
FIG. 2 is an illustration of a flowchart of a process for managing tapes in accordance with an illustrative embodiment.

Turning next to FIG. 2, a flowchart of a process for managing tapes is depicted in accordance with an illustrative embodiment. The process illustrated in FIG. 2 may be implemented in tape manager 110 to manage tapes 102 in backup environment 100. In the illustrative example, the different steps performed by tape manager 110 may be implemented using at least one of software or hardware. When software is used, program code may be processed or run by computer system. The program code may be run by one or more processor units in the computer system.

The process begins by identifying a node for which a current set of tapes is present (step 200). The process identifies a fragmentation for the set of tapes (step 202). In step 202, fragmentation may be identified in a number of ways. In one illustrative example, identifying a fragmentation for the set of tapes is identified as follows:

$$Frag = N/(A/C)$$

where Frag is fragmentation; N is the number tapes used; A is the amount of storage needed for the data backed up for the node; and C is the tape capacity. The time value is an assumption which is directly correlated to overall number of tapes present due to fragmentation. More tapes mean that more time is needed to restore data which is detrimental to recovery time objective. The fragmentation also may be used as the threshold. The amount of fragmentation may be based on at least one of a service level agreement, a recovery time objective, a role of the node, a type of restore, or some other suitable type parameter.

The process determines whether the physical tape count for the current set of tapes exceeds a threshold for undesired fragmentation for the node (step 204). The determination in step 204 may be made any number of ways. For example, the process may determine whether an amount of time needed to restore data from the current set of tapes is greater than a time threshold for restoring the data in determining whether the physical tape count for the current set of tapes exceeds a threshold for undesired fragmentation. The time is set or selected using at least one of a service level agreement, a recovery objective, a role of the node, a type of restore, or some other suitable type of parameter. In another example, the fragmentation value may be used as the threshold instead of a time value or in addition to the time value.

When the physical tape count exceeds a threshold for undesired fragmentation, the process moves the data in the current set of tapes to a new set of tapes (step 206). The data is more contiguous in the new set of tapes than in the current set of tapes. The process terminates thereafter.

With reference to back to step 204, if the physical tape count for the current set of tapes does not exceed the threshold for undesired fragmentation permanent, the process terminates. This process may be performed for any number of nodes. Additionally, the process may be performed for a group of two or more nodes rather than a single node, depending on the implementation.

Figure 3:
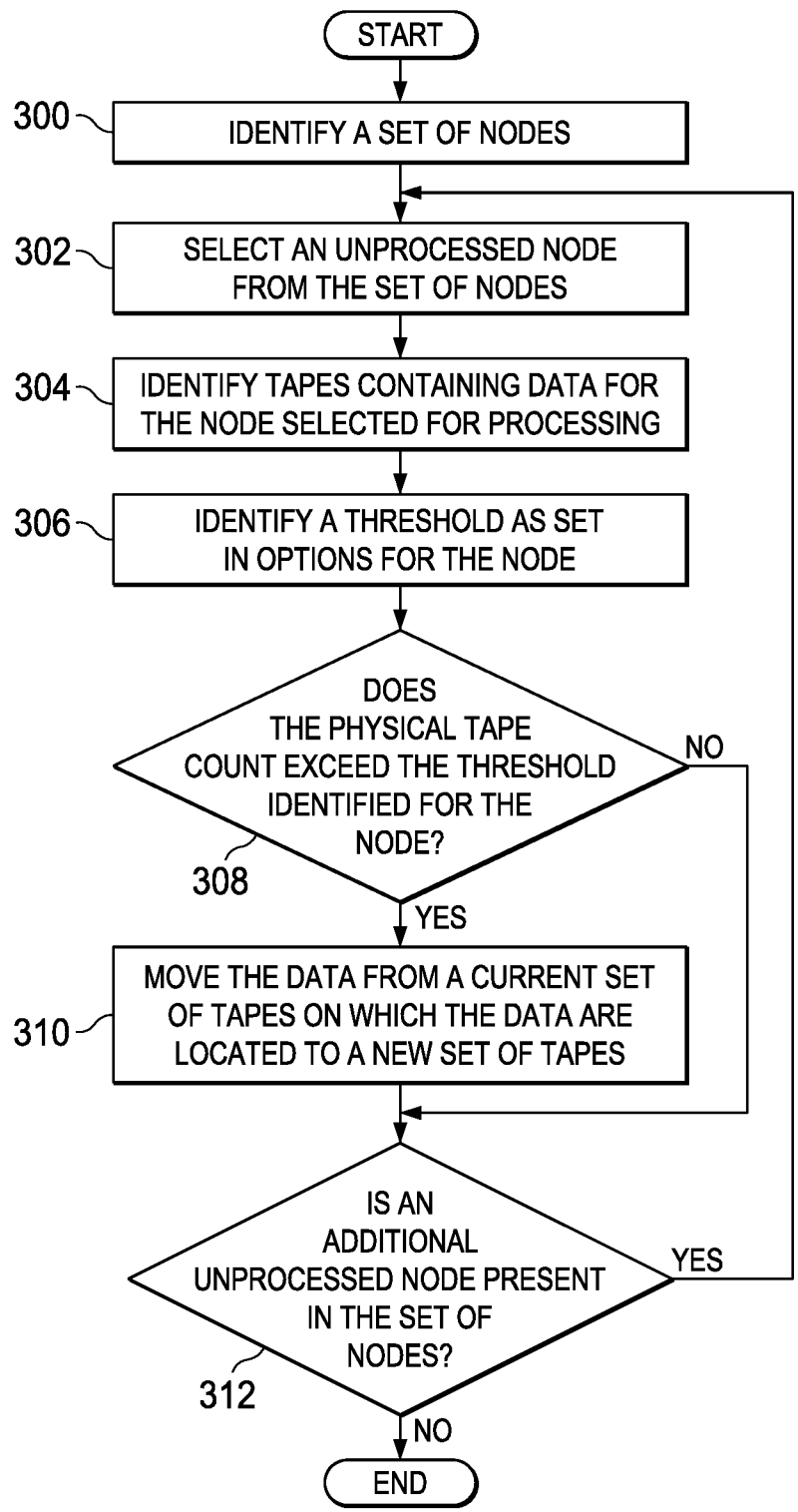
FIG. 3 is an illustration of a flowchart of a process for managing backups on tapes in accordance with illustrative embodiment.

With reference now to FIG. 3, a flowchart of a process for managing backups on tapes is depicted in accordance with an illustrative embodiment. The process illustrated in FIG. 3 may be implemented in tape manager 110 to manage tapes 102 in backup environment 100. In the illustrative example, the different steps performed by tape manager 110 may be implemented using at least one of software or hardware. When software is used, program code may be processed or run by computer system. The program code may be run by one or more processor units in the computer system.

This process may be run on a periodic basis to manage tapes and consolidate data backed up for nodes. The process may be run daily, weekly, or after some other period of time. This process also may be run in response to a request for consolidation or defragmentation of data. This process may be controlled through configurations or settings that are created or modified by administrators of the backup system. The process may be run as a program, a script, or in some other form. This process may reside on a backup server, a recovery server, or some other location.

The process begins by identifying a set of nodes (step 300). The set of nodes may be identified from a catalog in the backup server database. The set of nodes may have one or more nodes for processing. The process selects an unprocessed node from the set of nodes (step 302). The process identifies tapes containing data for the node selected for processing (step 304). The process then identifies a threshold as set in options for the node (step 306). In step 306, the threshold is set on a per node basis. The threshold may also be set on another basis or bases determined to be of value to the specific situation, i.e. a group of nodes, a portion of a single node attributed to a particular drive, or specific data belonging to an application of a single node or group of nodes. In other words, each node may have a different threshold. The threshold is a value such as a percentage fragmentation.

This threshold may be determined in a manner similar to the time threshold. For example, at least one of a service level agreement, a recovery time objective, a role of the node, a type of restore, or some other suitable type of parameter may be used. In this example, each node, node group, or portion of a node may have a specific fragmentation threshold. Some nodes may be critical and will have a more stringent threshold than other nodes. Further, other nodes used for testing or development may be less critical and will have a lower threshold which is considered acceptable. Thus, with thresholds on a per node basis, a node may have a different threshold from other nodes.

Using percentage fragmentation as a threshold may depend on whether the nodes in the set still need to be acted upon individually or can they be acted upon simultaneously, such that the data belonging to the nodes within the set of nodes may be moved at the same time to the new tapes. This process will extricate the data belonging to the set of nodes from the common tape pool where other data resides belonging to other nodes not part of the set. The data being written simultaneously for more than one node will still have a level of fragmentation when written to the new tape set. However, this amount of fragmentation may be reduced to an acceptable level.

The process determines whether the physical tape count exceeds the threshold identified for the node (step 308). If the physical tape count exceeds the threshold, the process moves the data from a current set of tapes on which the data is located to a new set of tapes (step 310). Step 310 makes the data more contiguous on the new set of tapes as compared to the current set of tapes. In this manner, fragmentation is reduced even with co-located tape pools. As a result, if restoration of the data is needed, the restoration may be performed more quickly using a new set of tapes.

The process then determines whether an additional unprocessed node is present in the set of nodes (step 312). If an additional unprocessed node is present, the process returns to step 302. Otherwise, the process terminates. With reference again the step 308, if the physical tape does not exceed the threshold, the process also proceeds to step 312.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 4:
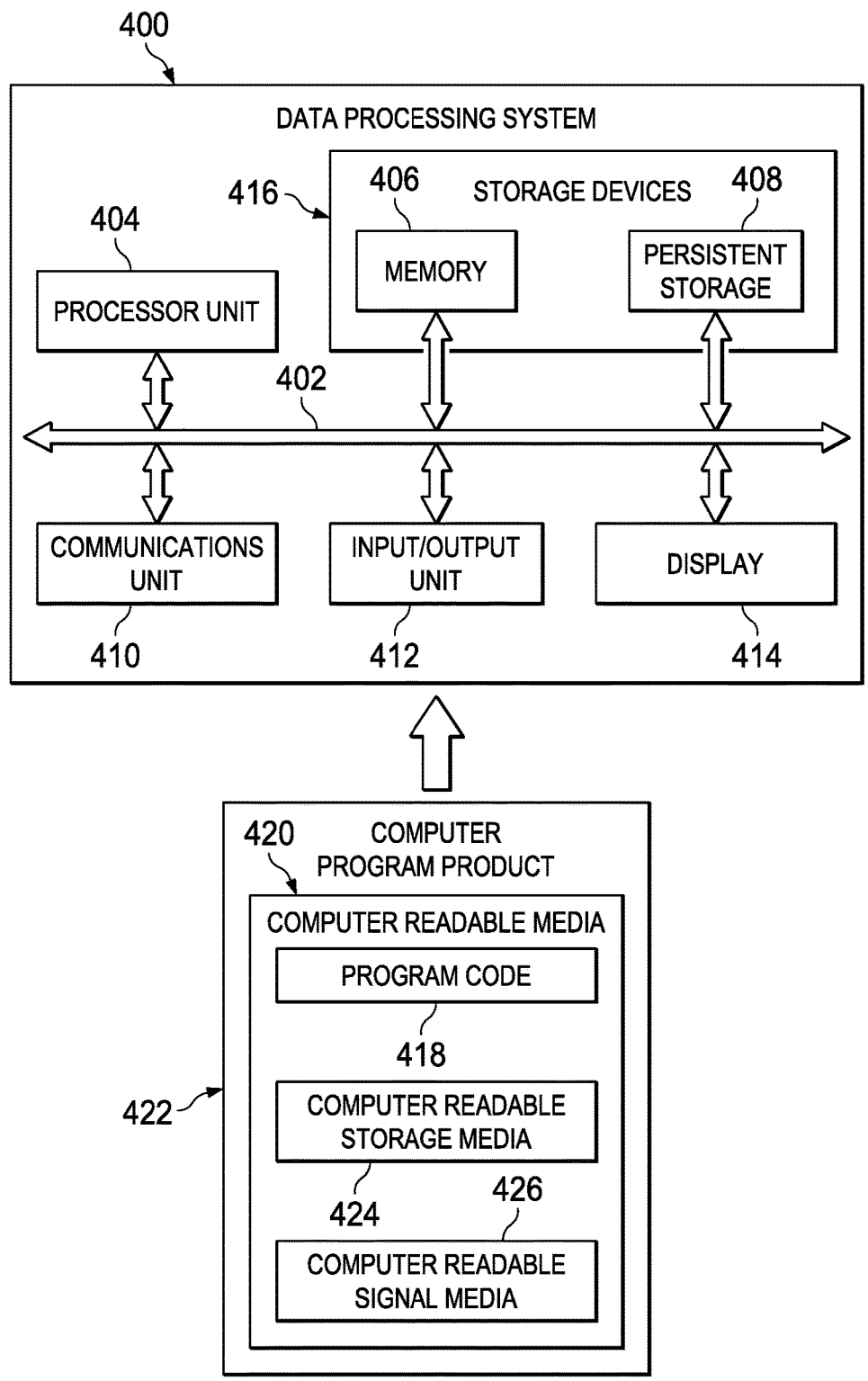
FIG. 4 is an illustration of a block diagram of a data processing system in accordance with an illustrative embodiment.

Turning now to FIG. 4, an illustration of a block diagram of a data processing system is depicted in accordance with an illustrative embodiment. Data processing system 400 may be used to implement computer system 118 and computer systems that form nodes 106 shown in FIG. 1. In this illustrative example, data processing system 400 includes communications framework 402, which provides communications between processor unit 404, memory 406, persistent storage 408, communications unit 410, input/output unit 412, and display 414. In this example, communication framework 402 may take the form of a bus system.

Processor unit 404 serves to execute instructions for software that may be loaded into memory 406. Processor unit 404 may be a number of processors, a multi-processor core, or some other type of processor, depending on the particular implementation.

Memory 406 and persistent storage 408 are examples of storage devices 416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 416 may also be referred to as computer-readable storage devices in these illustrative examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a solid state hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through at least one of a keyboard, a mouse, or some other suitable input device. Further, input/output unit 412 may send output to a printer. Display 414 provides a mechanism to display information to a user.

Instructions for at least one of the operating system, applications, or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer-usable program code, or computer-readable program code that may be read and executed by a processor in processor unit 404. The program code in the different embodiments may be embodied on different physical or computer-readable storage media, such as memory 406 or persistent storage 408.

Program code 418 is located in a functional form on computer-readable media 420 that is selectively removable and may be loaded onto or transferred to data processing system 400 for execution by processor unit 404. Program code 418 and computer-readable media 420 form computer program product 422 in these illustrative examples. In one example, computer-readable media 420 may be computer-readable storage media 424 or computer-readable signal media 426.

In these illustrative examples, computer-readable storage media 424 is a physical or tangible storage device used to store program code 418 rather than a medium that propagates or transmits program code 418.

Alternatively, program code 418 may be transferred to data processing system 400 using computer-readable signal media 426. Computer-readable signal media 426 may be, for example, a propagated data signal containing program code 418. For example, computer-readable signal media 426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code 418.

Thus, illustrative embodiments of the present invention provide a computer implemented method, computer system, and computer program product for managing tapes storing a backup for a node. The management of the tapes is performed to reduce fragmentation and results in increased backup consolidation of data stored for a node. As depicted, the computer system identifies the node for which a current set of tapes is present. The computer system also determines whether the physical tape count for the current set of tapes exceeds a threshold for undesired fragmentation for the node. The computer system moves the data in the current set of tapes to a new set of tapes when the physical tape count exceeds a threshold for undesired fragmentation, wherein the data is more contiguous in the new set of tapes than in the current set of tapes.

In the illustrative examples, automated data collection and analysis of fragmentation may occur. The process may allow for automated correction or consolidation of data. As a result, more timely restores of data may occur. Additionally, a reduction in missing service-level agreements and avoiding penalties for missing service-level agreements also may be reduced. In this manner, one or more illustrative examples may provide one or more technical solutions that consolidate data for tape backups based on the amount of fragmentation that is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowcharts or block diagrams may represent a module, a segment, or a portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for managing tapes storing a backup for a node, the method comprising:
   identifying, by a computer system, the node for which a current set of tapes is present;
   determining, by the computer system, whether a physical tape count for the current set of tapes exceeds a threshold for undesired fragmentation for the node; and
   moving, by the computer system, data in the current set of tapes to a new set of tapes when the physical tape count exceeds the threshold for undesired fragmentation, wherein the data is more contiguous in the new set of tapes than in the current set of tapes.

2. The method of claim 1 further comprising:
   identifying a fragmentation for a set of tapes as follows:

$Frag=N/(A/C)$ where Frag is fragmentation; N is a number tapes used; A is an amount of storage needed for the data backed up for the node; and C is a tape capacity.

3. The method of claim 1, wherein determining whether the physical tape count exceeds the threshold for undesired fragmentation for the node comprises:
   determining whether an amount of time needed to restore the data from the current set of tapes is greater than a time threshold for restoring the data.

4. The method of claim 3, wherein the amount of time is set using at least one of a service level agreement, a recovery objective, a role of the node, or a type of restore.

5. The method of claim 1, wherein the threshold is set on a per node basis.

6. The method of claim 1, wherein the current set of tapes is for a portion of the node.

7. The method of claim 6, wherein the portion of the node is selected from a group comprising a drive, a directory, active data, inactive data, all data, and a virtual computer, and all data.

8. The method of claim 1, wherein the node is selected from a group comprising a physical node and a virtual node.

9. A computer system comprising:
   a processor unit; and
   a tape manager running on the processor unit, wherein the tape manager identifies a node for which a current set of tapes are present; determines whether a physical tape count for the current set of tapes exceeds a threshold for undesired fragmentation for the node; and moves data in the current set of tapes to a new set of tapes when the physical tape count exceeds the threshold for undesired fragmentation, wherein the data is more contiguous in the new set of tapes than in the current set of tapes.

10. The computer system of claim 9, wherein the tape manager identifies a fragmentation for a set of tapes as follows:

$Frag=N/(A/C)$ where Frag is fragmentation; N is a number tapes used; A is an amount of storage needed for the data backed up for the node; and C is a tape capacity.

11. The computer system of claim 9, wherein in determining whether the physical tape count exceeds the threshold for undesired fragmentation for the node, the tape manager determines whether an amount of time needed to restore the data from the current set of tapes is greater than a time threshold for restoring the data.

12. The computer system of claim 11, wherein the amount of time is set using at least one of a service level agreement, a recovery objective, a role of the node, or a type of restore.

13. The computer system of claim 9, wherein the threshold is set on a per node basis.

14. The computer system of claim 9, wherein the current set of tapes is for a portion of the node.

15. The computer system of claim 14, wherein the portion of the node is selected from a group comprising a drive, a directory, active data, inactive data, all data, and a virtual computer, and all data.

16. The computer system of claim 9, wherein the node is selected from a group comprising a physical node and a virtual node.

17. A computer program product for managing tapes storing a backup for a node, the computer program product comprising:
   a computer-readable storage media;
   a first program code, stored on the computer-readable storage media, for identifying a node for which a current set of tapes are present;
   a second program code, stored on the computer-readable storage media, for determining whether a physical tape count for the current set of tapes exceeds a threshold for undesired fragmentation for the node; and
   a third program code, stored on the computer-readable storage media, for moving data in the current set of tapes to a new set of tapes when the physical tape count exceeds the threshold for undesired fragmentation, wherein the data is more contiguous in the new set of tapes than in the current set of tapes.

18. The computer program product of claim 17 further comprising:
   A fourth program code, stored on the computer-readable storage media, for identifying a fragmentation for a set of tapes as follows:

$Frag=N/(A/C)$ where Frag is fragmentation; N is a number tapes used; A is an amount of storage needed for the data backed up for the node; and C is a tape capacity.

19. The computer program product of claim 17, wherein the second program code comprises:
   program code, stored on the computer-readable storage media, for determining whether an amount of time needed to restore data from the current set of tapes is greater than a time threshold for restoring the data.

20. The computer program product of claim 19, wherein the amount of time is set using at least one of a service level agreement, a recovery objective, a role of the node, or a type of restore.

* * * * *